United States Patent [19]

Goody

[11] 4,222,179

[45] Sep. 16, 1980

[54] DEVICE FOR AIDING IN THE SELECTION OF A BALANCED DIET

[76] Inventor: Roy W. Goody, 281-4 Rio Verde Pl., Milpitas, Calif. 95131

[21] Appl. No.: 963,129

[22] Filed: Nov. 22, 1978

[51] Int. Cl.³ .............................................. G09B 25/00
[52] U.S. Cl. ......................................... 35/1; 40/10 C; 116/319; 428/24
[58] Field of Search ........................... 35/1, 8 R, 23 R; 428/24, 25, 26; 40/2 G, 10 C, 312; 116/319

[56] References Cited

U.S. PATENT DOCUMENTS

| | | | |
|---|---|---|---|
| 2,356,561 | 8/1944 | Bennett | 35/1 |
| 3,161,559 | 12/1964 | Tong | 428/26 |
| 3,547,747 | 12/1970 | Roberts | 428/35 X |
| 3,903,579 | 9/1975 | Zane et al. | 428/26 X |

FOREIGN PATENT DOCUMENTS 712611  9/1966  Italy .......................................... 428/26

OTHER PUBLICATIONS

"Lazy Susan Cannister Set", Item Y, pp. 144, 145 Fall 1960 General Merchandise Catalog.

*Primary Examiner*—Harland S. Skogquist
*Attorney, Agent, or Firm*—Jack M. Wiseman

[57] ABSTRACT

A device for aiding in the selection of a balanced diet. The device comprises a container in which is disposed an upright artificial stem. On the outer walls of the container are displayed food group indicia for achieving a balanced diet. Mounted on the stem and extending radially outward therefrom are artificial branches. At the distal end of each branch is a vertically disposed plate having grooves along the perimeter thereof. The grooves are angularly spaced along the perimeter of the plate. Adjustably mounted on each plate is an artificial petal. The petals are adjustably movable along the vertical plates, respectively, in a pivotal movement in a vertical direction. Initially, the petals are disposed in the elevated position. Each petal designates a nutritional group of food represented by the indicia on the outer walls of the container. As food from a nutritional group is consumed, the associated petal is moved downwardly a distance commensurate with the quantity of nutritional value consumed. A balanced diet is reflected in a symmetrical petal arrangement. An unbalanced diet is reflected in an asymmetrical petal arrangement. The quantity of food consumed in relation to a recommended minimum is reflected in the angular location of each petal.

9 Claims, 7 Drawing Figures

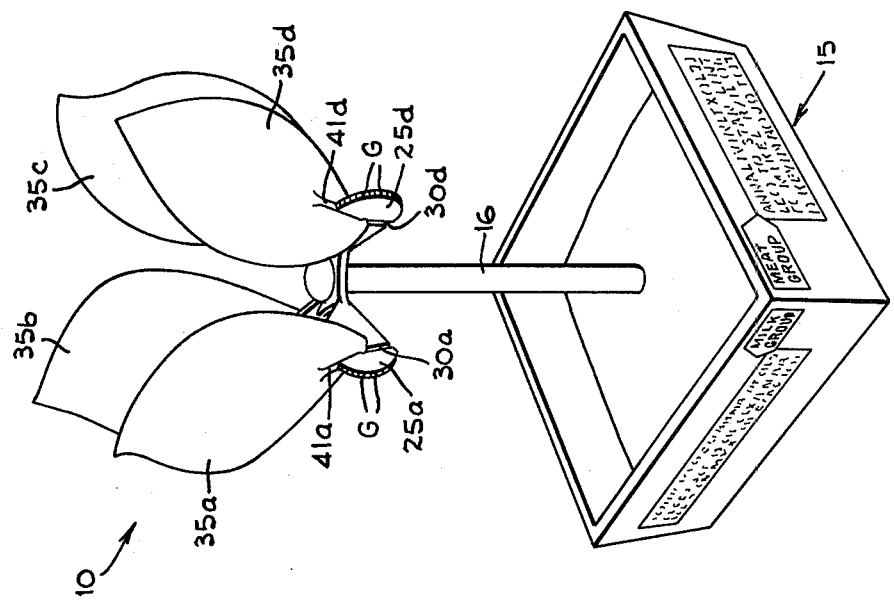
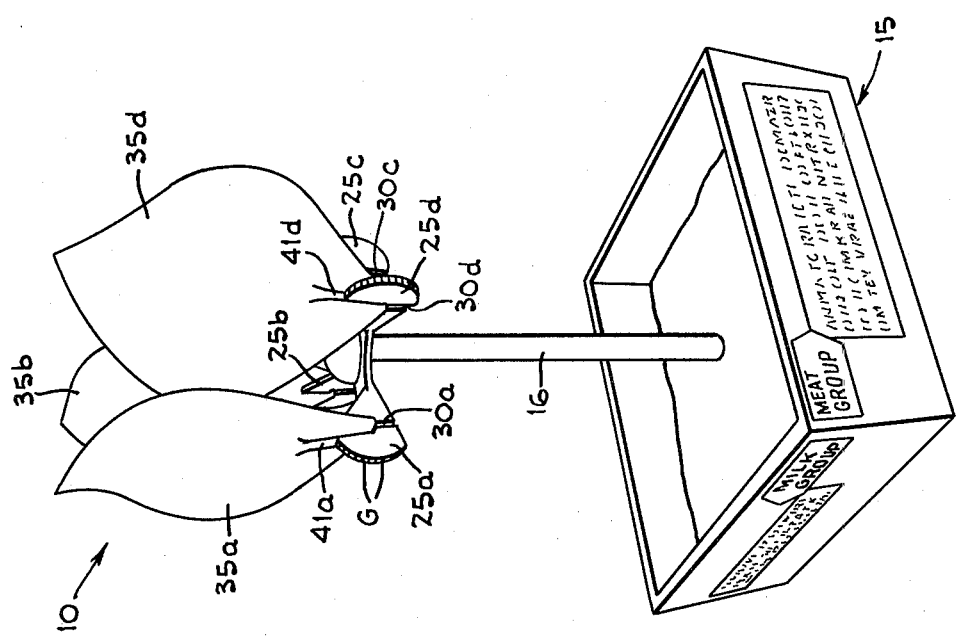

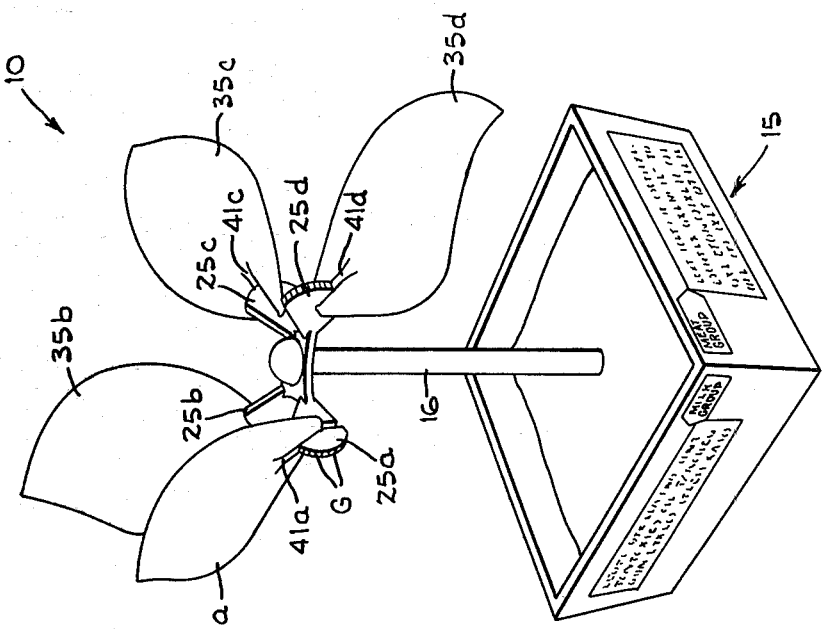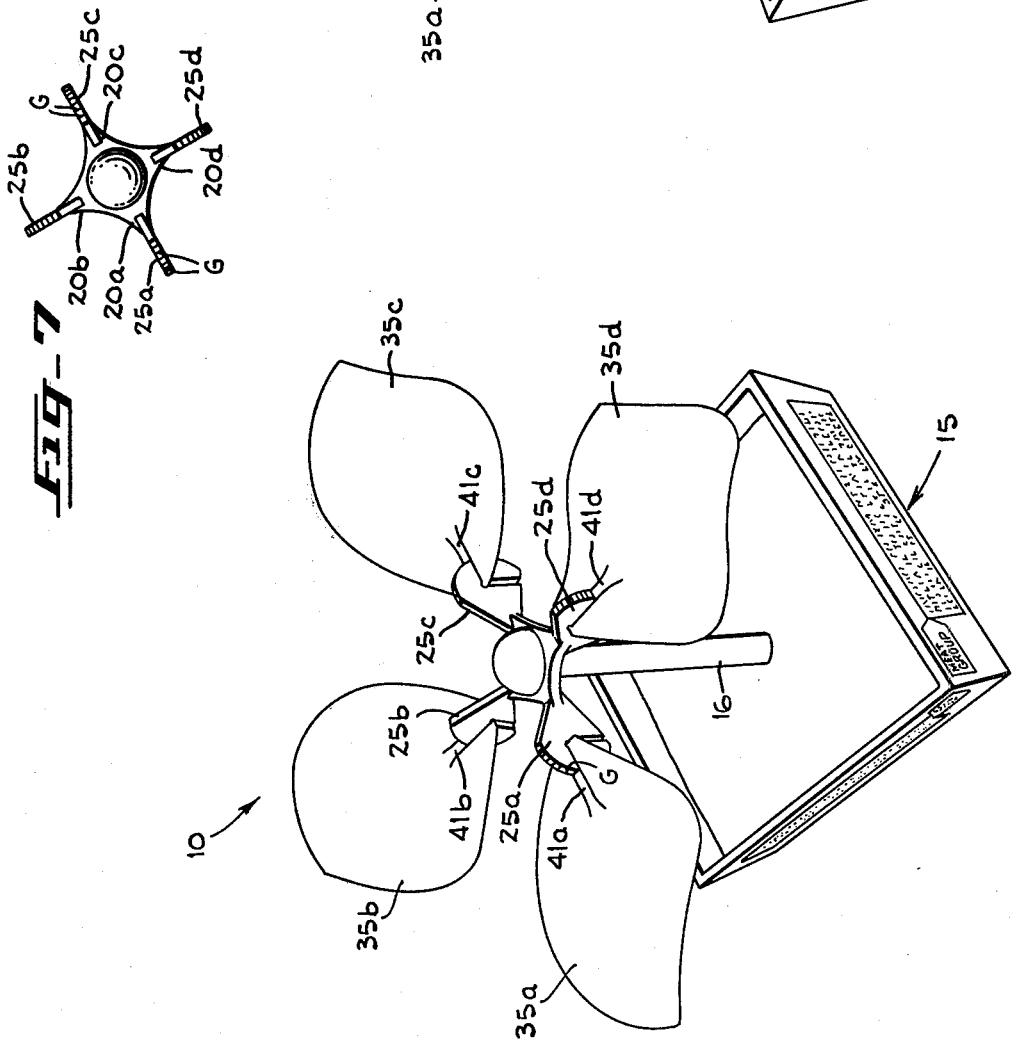

DEVICE FOR AIDING IN THE SELECTION OF A BALANCED DIET

BACKGROUND OF THE INVENTION

The present invention relates in general to devices for aiding in the selection of a balanced diet, and more particularly to a device for aiding in the selection of a balanced diet by observing the symmetrical or assymetrical appearance of the device and the angular location of each petal.

In the patent to Godshalk U.S. Pat. No. 3,321,847, there are disclosed devices for training the eye to recognize visual balance. Wires extend from a block of clay. Pegs are disposed at the free ends of the wires, respectively.

The patent to Zane, U.S. Pat. No. 3,903,579, discloses an artificial flower having tiltable adjustable petals. The artificial flower comprises a plastic pistil and plastic petals spaced outwardly therefrom. The petals are connected to the pistil by flexible stems. The stems are of U-shaped configuration. Thus, each of the flower petals is adjustable through a tiltable action.

As for the patent to Carlsson, U.S. Pat. No. 2,314,387, it discloses a balanced diet selection apparatus. The apparatus thereof comprises a centrally fulcrumed support. On one end of the support is mounted a card displaying the elements of a balanced diet. On the other end of the support are selected blocks of different weights. Each block has an element of a balanced diet illustrated on it. Weights are also placed on the one side of the support. A balanced diet is reflected in the support assuming a horizontal position. An unbalanced diet is reflected in the board being displaced from the horizontal position.

Other patents of interest are: U.S. Pat. Nos. 3,681,857; 2,239,819; 3,616,107; 2,096,410; 2,856,561.

Heretofore, many individuals relied on traditional eating habits to maintain good nutrition. Such methods were unsatisfactory and generally resulted in poor nutrition for various reasons. One reason was that the individual did not keep a record of the various nutrients he consumed throughout the day. Another reason was the lack of a practical way for comparing his daily eating habits with recommended daily values. Further, the individual did not analyze his eating patterns to determine in which areas of nutrient he might be deficient or overindulgent. It appears desirable to provide an attractive, simple to use, pictorial device for tabulating, comparing and displaying the amounts of nutrition consumed in each selected food group to aid an individual in selecting a balanced diet that includes an adequate supply of nutrients.

SUMMARY OF THE INVENTION

A device for aiding in the selection of a balanced diet in which indicia on nutritional values of various quantities of different foods in selected food groups are displayed. The device comprises adjustably movable members, which are respectively positioned in accordance with the nutritional values of various quantities of different foods consumed. There is an adjustable member for each food group. A balanced diet is reflected in the device having a symmetrical appearance. An unbalanced diet is reflected in the device having an asymmetrical appearance. A nutritionally inadequate diet is reflected in one or more members not being fully extended.

A feature of the present invention is that the device is in the form of an artificial flower in a container. The container has displayed on the exposed walls thereof nutritional food group indicia for achieving a balanced diet. Disposed in the container is an artificial flower with a plurality of adjustably movable petals. Each petal represents a nutritional group of food. As food from a nutritional group is consumed, the associated petal is displaced a distance commensurate with the quantity of nutritional value consumed. A symmetrical arrangement for the petals shows a balanced diet. An asymmetrical arrangement for the petals shows an unbalanced diet. A nutritionally inadequate diet is reflected in one or more petals not being fully extended.

By virtue of the present invention, a device provides a visual indication to illustrate a comparison of food nutrients consumed among food groupings to determine whether an individual enjoys a balanced diet or an unbalanced diet, and an evaluation of the quantity of food consumed within each group to determine whether an individual has consumed the recommended minimum requirements.

A feature of the present invention is that the device of the present invention comprises an artificial flower disposed within a container having a plurality of exposed sides. Indicia relating to nutritional value of various food groups are disposed on each exposed side of the container, respectively.

Another feature of the present invention is the positioning of an artificial stem in a container that extends uprightly therefrom. Branching radially outwardly from the artificial stem are artificial petals. There is one petal for each side of the container or for each food group having nutritional value indicia illustrated on the associated side of the container. Means support each petal individually for angular displacement relative to a branch extending from the stem. Each petal is adjustably movable for angular displacement. By moving each petal individually in accordance with the nutritional value of the food of a food group consumed, one can observe by the symmetrical arrangement of the petals or the lack of a symmetrical arrangement of the petals whether the individual is having a balanced diet. By the extent of displacement of each petal, one can observe whether the individual has consumed the recommended minimum requirement of food within each food group.

DESCRIPTION OF THE DRAWINGS

FIG. 3 is a perspective view of the device shown in FIG. 1 illustrated with the petals thereof in a closed budding arrangement.

FIG. 4 is a perspective view of the device shown in FIG. 1 illustrated with the petals thereof in a partially opened arrangement.

FIG. 5 is a perspective view of the device shown in FIG. 1 illustrated with the petals thereof symmetrically disposed about the stem for showing a balanced diet with adequate nutrients for each food group.

FIG. 6 is a perspective view of the device shown in FIG. 1 illustrated with the petals thereof asymmetrically disposed about the stem for showing an unbalanced diet and a nutritionally inadequate consumption of food within several of the food groups.

FIG. 7 is a plan view of the branches employed in the device shown in FIG. 1.

DESCRIPTION OF THE PREFERRED EMBODIMENT

Figure 1:
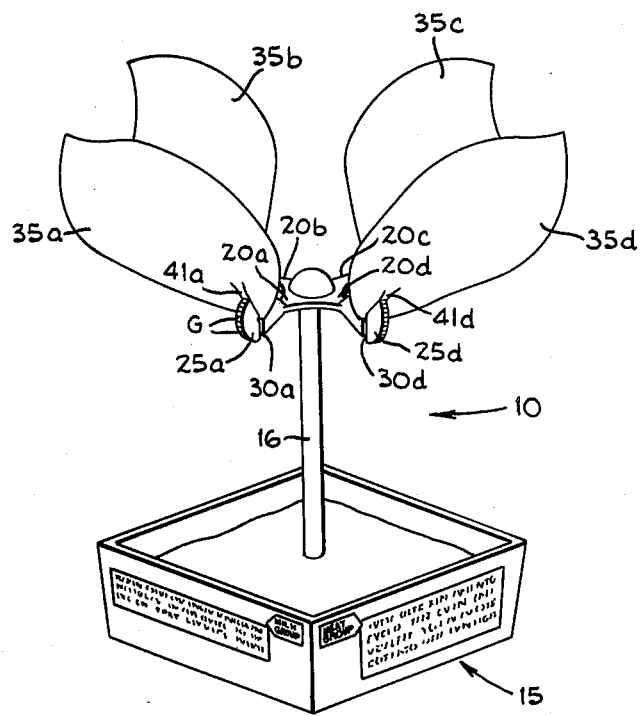
FIG. 1 is a perspective view of a device for aiding in the selection of a balanced diet embodying the present invention.
Figure 2:
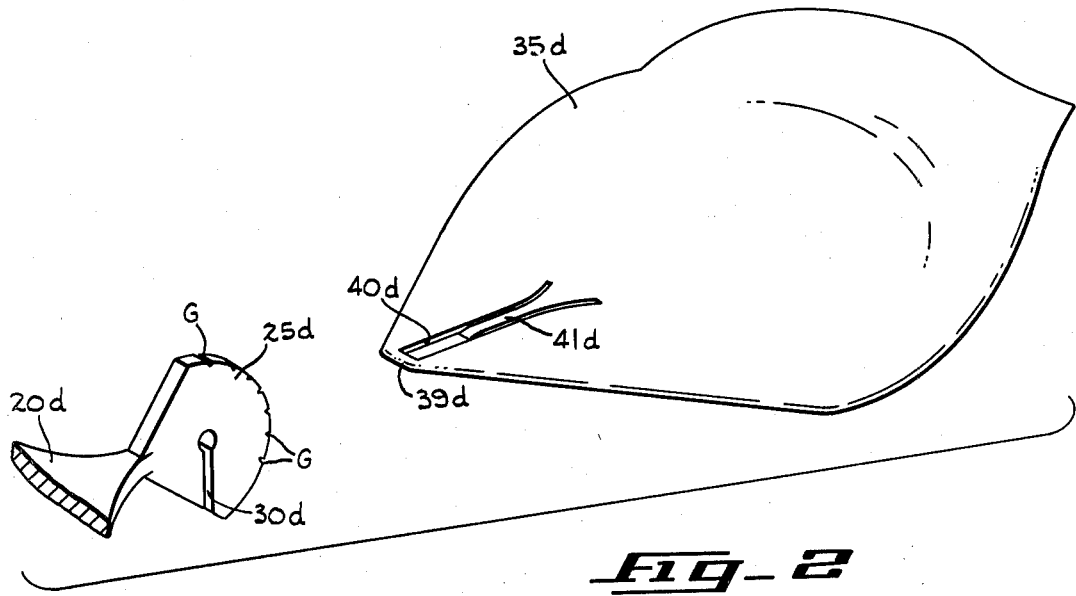
FIG. 2 is an enlarged fragmentary exploded perspective view of an artificial petal and means for supporting the petal from a stem employed in the device shown in FIG. 1 for adjustably moving the petal relative to the stem.

Illustrated in FIGS. 1 and 3-6 is a device 10 for aiding in the selection of a balanced and nutritionally adequate diet. The device 10 comprises a container 15, which in the exemplary embodiment has four sides. On each exposed side of the container 15 are indicia. The indicia for each exposed side of the container 15 represent a different food group. For example, on one side are indicia for a milk group. On another side are indicia for a meat group. On a third side are indicia for a vegetable and fruit group. Lastly, on the fourth side are indicia for a bread and cereal group. Also included on each side are indicia designating various foods falling within each selected food group. Additionally, information indicating the nutritional food value for various servings of the food in each food group is also shown on the sides of the container 15. Also, a correlation is also provided between the particular food and the nutritional value of the food related to the quantity thereof needed for a balanced diet. All of such information has been published by the National Dairy Council, Chicago, Illinois, in a publication entitled *A Guide to Good Eating*, 3rd Edition, published in 1971. Disposed within the container 15 is an uright member or a stem 16. The stem 16 has a cylindrical configuration and is made of a suitable rigid material, such as plastic. The lower end of the stem 16 is suitably disposed in a suitable vertical bore, not shown, formed in the base of the container 15 for removably mounting the stem 16 in an upright position.

Projecting radially outward from the stem 16 are radially disposed members or branches 20a-20d, which are spaced apart equal angular distances. In the exemplary embodiment, there is a branch for each side of the container 15. More specifically, the branches 20a-20d include a common hub with a central opening in which opening is disposed the stem 16. Projecting from the hub are the branches 20a-20d. The branches 20a-20d are made of a suitable plastic material. The stem 16 at the upper end thereof is formed with an annular radially projecting flange, not shown, about its cylindrical wall, on which is removably seated or supported the common hub for the branches 20a-20d.

At the distal end of each branch 20a-20d is integrally formed a vertically disposed petal support member, such as metal support members 25a-25d. Each support member, such as support members 25a-25d, is formed with a vertically disposed semi-cylindrical free end. Formed along the perimeter of each semi-cylindrical free end for the support members 25a-25d, respectively, are angularly spaced grooves G. The grooves G extend transversely across the perimeter of their associated support members so as to be radially disposed and spaced apart equal angular distances. Also found in each of the support members 25a-25d, respectively, is a radial slot, such as radial slots 30a-30d.

Supported by each of the branches 25a-25d, respectively, is an artificial petal, such as petals 35a-35d. The petals 35a-35d are made of suitable material, such as plastic. There is one petal for each side of the container 15 or for each food group. Formed in each petal, respectively, is a suitable opening, such as openings 40a-40d. At the distal end of each petal is a pivotal end, such as pivotal ends 39a-39d, for entering the associated slot of the support member. The pivotal ends 39a-39d are received, respectively, by the slots 30a-30d for pivotal movement therewithin. The petals 35a-35d are positioned so that the pivotal ends 39a-39d thereof seat in the slots 30a-30d, respectively, at the axial center of the support members 25a-25d, respectively, for pivotal movement therewithin.

The petals 35a-35d are adjustably movable along the perimeters of the support members 25a-25d, respectively, and are retained in the adjusted position therealong through an associated groove G receiving a detent, such as detents 41a-41d, of the petals 35a-35d, respectively. More specifically, each detent 41a-41d confronting the openings 40a-40d, respectively, but opposite from the pivotal ends 39a-39d with respect to the openings 40a-40d, is disposed in radial alignment with the support members 30a-30d, respectively, to be inserted into a selected groove G at the perimeters of the support members 30a-30d to hold individually the petals 35a-35d in an adjusted position.

The grooves G are sufficiently deep and the detents 41a-41d are configured to be received and retained in a groove G of the associated support member. The indents 40a-40d may be slightly flexible to facilitate entry into and removal from a groove G, but they are sufficiently rigid to hold the associated petal in an adjusted position. The indents 40a-40d enter the groove G with a snapping action, such as experienced through a leaf spring, to produce an audible click. The audible click aids in determining the number of successive grooves for the movement so as to correctly count the angular distance of travel for the adjustment of the petal.

In the use of the device 10, each petal 35a-35d is placed in the closed budding position (FIG. 3) at the beginning of each day before the first meal is consumed. After each meal is consumed, the petals 35a-35d are adjustably moved to the opened, flowering position (FIG. 4) in accordance to the indicia on the container 15 and the nutritional value of the quantity of food consumed during the meal. After the last meal of the day is consumed, the device 10 is observed. If the diet is well-balanced and the minimum nutritional requirements have been met within each food group, the device 10 will have the petals 35a-35d thereof disposed in a bloomed, symmetrical arrangement (FIG. 5). On the other hand, should the diet be unbalanced or poorly selected and there is a nutrient inadequacy from one or more food groups, then the device 10 will have the petals 35a-35d thereof in a bloomed, asymmetrical arrangement (FIG. 6).

The indicia on the sides of the container 15 are a summary of each food group which explain the size of a serving, the various kinds of food that belong to each food group, and the nutritional value for each serving of each food group. This information is readily available from the publication of the National Dairy Council, Chicago, Illinois, entitled *A Guide to Good Eating*, 3rd Edition, published in 1971. The petals 35a-35d are adjustably positioned along the perimeters of the support members 25a-25d, respectively, in accordance with the nutritional value of the quantity of food consumed from each food group, respectively.

The groove G are angularly spaced apart commensurate with the serving requirements for a balanced diet of its associated food group compared with the serving requirements of a balanced diet for the remaining food groups so that a symmetry of petal arrangement is achieved for a balanced diet. The grooves G are spaced so that the recommended minimum requirements for each food group results in a rotation of approximately 90° to the bloomed position. The operator of the device 10 need only determine the number of servings for each food group and move each of the petals, respectively, along the associated support members the appropriate number of grooves G. Additionally, the angular distances between successive grooves G of each support member are spaced, preferably, to reflect a fraction of a serving for its associated food group. For example, three successive grooves G represent a single serving. The groove distances would then be small enough to provide accuracy, but yet large enough to allow easy tabulation of the food nutrients consumed.

By way of example, after breakfast, when one glass of orange juice is consumed, the operator moves the petal for the fruit and vegetable group down three grooves G. When two eggs are consumed, the operator moves the petal for the meat group down three grooves G. Should one-third of a cup of milk be consumed, the petal for the milk group is moved down one groove G. Should a bowl of cereal be consumed, the petal representing the bread and cereal group is moved down three grooves G.

I claim:

1. A device for aiding in the selection of a balanced diet comprising:
   (a) a housing;
   (b) an upright member disposed in said housing;
   (c) a plurality of outwardly extending members projecting from said upright member; and
   (d) an adjustably movable member mounted on each of said outwardly extending members for pivotal movement relative thereto,
   (e) said housing having food indicia along an exposed wall thereof, and said adjustably movable members being movable in accordance with the consumption of food, the indicia on said housing relates to a plurality of food groups, there being an adjustably movable member for each food group.

2. A device as claimed in claim 1 wherein the movement of each movable member displays the amount of food consumed for each food group respectively compared to minimum nutritional value for each food group respectively.

3. A device as claimed in claim 2 wherein a symmetrical arrangement of said movable members displays a balanced diet and an asymmetrical arrangement of said movable members displays an unbalanced diet.

4. A device as claimed in claim 3 wherein said adjustably movable members are artificial flower petals.

5. A device as claimed in claim 4 wherein said upright member is an artificial cylindrical stem.

6. A device as claimed in claim 5 wherein each of said outwardly extending members is a branch extending radially outward from said stem.

7. A device as claimed in claim 6 wherein said housing is a container for an artificial flower having a plurality of exposed side walls, there being an exposed side wall for each of said petals, each of said side walls displaying food indicia for various different food groups.

8. A device as claimed in claim 7 wherein each of said branches includes a vertically disposed member with a perimetric arcuate wall having an axis, said petals being supported by said vertically disposed members, respectively, for pivotal movement, each of said vertically disposed members being formed with a plurality of angularly spaced grooves along its perimetric arcuate wall radially disposed relative to its associated axis, each of said petals being formed with a pivotal end supported at the axis of its associated vertically disposed member for pivotal movement about the axis of its associated vertically disposed member, each of said petals being formed with a detent receivable in a selected groove of the grooves formed in the perimetric arcuate wall of its associated vertically disposed member for being retained at an adjusted location.

9. A device as claimed in claim 8 wherein the successive grooves of each of said vertically disposed member are spaced apart a predetermined angular distance in accordance with food nutritional value of various foods in its associated food group, whereby the petals form a symmetrical arrangement for the consumption of a balanced diet and the petals form an asymmetrical arrangement for the consumption of an unbalanced diet, and the petals being extended in accordance with the consumption of food compared to minimum nutritional values of the various foods in its associated food group.

* * * * *